(12) United States Patent
Nichols

(10) Patent No.: US 7,730,805 B2
(45) Date of Patent: Jun. 8, 2010

(54) MOTOR VEHICLE PARK BRAKE CABLE AND EYELET

(75) Inventor: Jerry Dewayne Nichols, Columbus, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 765 days.

(21) Appl. No.: 11/280,646

(22) Filed: Nov. 16, 2005

(65) Prior Publication Data
US 2006/0162480 A1 Jul. 27, 2006

Related U.S. Application Data

(60) Provisional application No. 60/643,750, filed on Jan. 13, 2005.

(51) Int. Cl.
*F16C 1/14* (2006.01)
(52) U.S. Cl. ..................................... 74/502.6
(58) Field of Classification Search .............. 74/502.4, 74/502.6
See application file for complete search history.

(56) References Cited

U.S. PATENT DOCUMENTS

| | | | | |
|---|---|---|---|---|
| 1,959,878 | A * | 5/1934 | Schroeder | 188/21 |
| 2,912,072 | A * | 11/1959 | Jones | 188/204 R |
| 5,246,303 | A * | 9/1993 | Trilla et al. | 403/353 |
| 6,739,434 | B1 * | 5/2004 | Pontius | 188/2 D |
| 6,820,516 | B2 * | 11/2004 | Grundke | 74/501.5 R |
| 6,971,816 | B2 * | 12/2005 | Miyagawa et al. | 403/397 |

FOREIGN PATENT DOCUMENTS

JP          62006863 A  *  1/1987

OTHER PUBLICATIONS

Dura Automotive Systems Blueprint for Part No. 81381000—Description: Steel Eye.

* cited by examiner

*Primary Examiner*—Vicky A Johnson
(74) *Attorney, Agent, or Firm*—Banner & Witcoff Ltd.; Peter D. McDermott; Dean B. Watson

(57) ABSTRACT

Bevel-cornered cable eyelets suitable to be operatively fitted onto a moveable brake arm of a motor vehicle park brake mechanism have an eyelet portion forming a bevel-cornered opening and a cable connection portion integral with the eyelet portion. In typical motor vehicle park brake applications, good performance can be achieved with the front corners beveled at an angle of 35-55 degrees to the front surface. The opening of the cable eyelet to receive the brake arm has a fore-and-aft inside dimension smaller than the lateral inside dimension of the opening. The bevel surfaces resist turning of the eyelet relative to the brake arm during normal use. A motor vehicle park brake cable comprises an elongate brake cable having a first end suitable to be connected to a park brake actuator and a second end attached to a bevel-cornered cable eyelet. The eyelet is readily disengaged from the brake arm, e.g., for repairs, service, etc. notwithstanding the beveled corners, by turning the eyelet 90° from its normal fore-and-aft orientation on the brake arm, e.g., manually or by other suitable technique.

7 Claims, 4 Drawing Sheets

MOTOR VEHICLE PARK BRAKE CABLE AND EYELET

CROSS-REFERENCE TO RELATED APPLICATIONS

This application claims priority from co-pending U.S. Provisional Application Ser. No. 60/643,750, filed 13 Jan. 2005, the disclosure of which is incorporated herein by reference.

INTRODUCTION

The present invention is directed to novel park brake cables comprising novel cable eyelets and to park brake assemblies comprising such park brake cables and cable eyelets. More particularly, the invention is directed to motor vehicle park brake cables and cable eyelets and to motor vehicle park brake assemblies comprising such park brake cables and cable eyelets.

BACKGROUND

Motor vehicle park brakes are known to employ a brake unit mounted at a wheel of the vehicle or driveshaft or other drivetrain component to be acted upon by the brake unit to secure the vehicle when parked. The brake unit typically has a brake pad or other friction member mounted for movement between a brake-applied position and a brake-unapplied position. In at least certain motor vehicle park brake designs the friction member is operably connected to a brake arm pivotally mounted to a housing or mounting bracket or other such component of the brake unit. The brake arm typically is connected to the end of a park brake cable which runs from a brake apply lever or other hand-operable brake actuator and/or from an electric or other automatic actuator. In certain designs the park brake cable has a cable eyelet that receives the brake arm. The cable eyelet opening must be sufficiently large to easily receive the brake arm and to be removed from the brake arm for service, repair and the like.

Applying the park brake involves tensioning the brake cable to move the brake arm and, in turn, to move the friction member of the park brake to the brake-applied position. Releasing the brake involves releasing the cable tension. Typically, a compression spring or the like is provided to assist in moving the brake arm quickly to the brake-unapplied position when the brake is released. A problem has been discovered involving the cable eyelet disconnecting from the brake arm, especially when releasing the park brake. More specifically, the brake arm slips from the cable eyelet opening, rendering the park brake inoperative until the brake cable is reattached by returning the cable eyelet onto the brake arm.

It is an object of the present invention to provide improved motor vehicle park brake cables and cable eyelets for same, and motor vehicle park brake assemblies employing such improved cables and eyelets. Additional and alternative objects of some or all embodiments of the invention will be understood by those skilled in this field of technology in view of the following disclosure and in view of the description provided of certain exemplary embodiments.

SUMMARY

In accordance with a first aspect, a motor vehicle park brake cable comprises an elongate brake cable having a first end suitable to be connected to a park brake actuator, e.g., a park brake lever or electric actuator in the passenger compartment of the motor vehicle. A second end of the park brake cable has a cable eyelet suitable to be operatively fitted onto a moveable brake arm of a park brake mechanism. The cable eyelet comprises an eyelet portion forming a bevel-cornered opening and a cable connection portion integral with the eyelet portion. The cable connection portion is connected to the second end of the brake cable. In certain exemplary embodiments the eyelet surfaces forming the bevel-cornered opening include, at least, parallel right and left side surfaces perpendicular to a front surface, with a beveled front right corner between the front surface and the right side surface (i.e., a bevel surface in place of a right angle junction of the front surface and the side surface), and a beveled front left corner between the front surface and the left side surface (i.e., again, in place of a right angle junction of the front surface and the side surface). In typical motor vehicle park brake applications, good performance can be achieved with the left front corner being beveled at an angle of about 35-55 degrees, e.g., 40-50 degrees to the front surface and the right front corner being beveled at an angle of about 35-55 degrees, e.g., 40-50 degrees to the front surface. Typically each beveled surface has a lateral dimension of at least about 20% and less than 50% of the lateral dimension of the eyelet opening, preferably at least about 25% and less than 33%. In embodiments wherein front bevel surfaces are symmetrical and each is 50% of the lateral dimension of the eyelet opening, the front surface becomes nil or vanishingly small. In certain exemplary embodiments one-quarter of the lateral dimension of the front surface is beveled by the beveled left front corner and one-quarter of the lateral dimension of the front surface is beveled by the beveled right front corner.

In certain exemplary embodiments the eyelet surfaces forming the opening also include a straight, forwardly facing rear surface parallel with the front surface. It should be understood that the opening of the cable eyelet to receive the brake arm has a fore-and-aft inside dimension, i.e., the dimension of the opening between the front surface and the rear of the opening, measured at the center of the front surface or other geometrically sensible location, that is smaller than the lateral inside dimension of the opening between the left and right side surfaces. In certain exemplary embodiments the fore-and-aft dimension at the center (i.e., at the lateral mid-point) of the opening is from about 65% to about 85% as large as the lateral dimension, e.g., about 75%. Because of the beveled corners, the fore-and-aft dimension at ether side typically will be about 40% to about 60%, e.g., about 50%-52%.

The park brake cables disclosed here can provide advantageous resistance to unintended disengagement from a brake arm, especially, e.g., a hook type brake arm, that is, a brake arm that has a forward extension at the end of a post portion such that the post extends through the eyelet opening and the head portion in normal operating orientation overhangs the forward inside surface of the eyelet opening. Unintended disengagement is resisted by the forward extension overhanging the perimeter of the eyelet opening and by the beveled corners. That is, the beveled corners of the eyelet opening of the cable eyelet advantageously resist disengagement of the cable eyelet from a brake arm during normal use, especially, e.g., during rapid travel of the brake arm and cable eyelet upon release of the park brake. Typical brake arms of a type preferred for use with the cable eyelets disclosed here have a base from which a post or neck extends with an enlarged hook or head providing a forward extension from the top of the neck. The head of the brake arm is inserted through the eyelet opening. At rest, the eyelet typically sits on the base of the brake arm with the neck of the brake arm extending through the eyelet opening. The fore-and-aft dimension of the eyelet opening is advantageously designed smaller than the foreand-aft dimension of the brake arm head, such that the eyelet is not removeable from the brake arm in the normal fore-and-aft operating orientation. The beveled corners of the eyelet opening resist unintended turning of the eyelet relative to the brake arm as a result of reaction forces and the like during operation of the park brake, especially during brake release. The eyelet is readily disengaged from the brake arm, e.g., for repairs, service, etc. notwithstanding the beveled corners, by turning the eyelet 90° from its normal fore-and-aft orientation on the brake arm. Turning can be accomplished manually or by other suitable technique.

In certain exemplary embodiments the cable connection portion extends rearwardly from the eyelet portion and comprises a rearwardly open, elongate socket receiving the second end of the brake cable. As used here (meaning in this disclosure and in the appended claims) "rearward," "rearwardly" and the like in reference to the cable eyelet refers to the direction toward the park brake cable, generally toward the park brake actuator. Thus, in typical embodiments rearward is the direction from which tension is applied to the cable to move the brake arm to the brake-applied position. As discussed further below, in certain exemplary embodiments the eyelet portion and the cable connection portion of the cable eyelet are unitary with each other. In certain exemplary embodiments they are unitary with each other as portions of a one-piece forging. For certain motor vehicle park brake applications, depending on the configuration of other components, good performance can be achieved with embodiments of the park brake cable disclosed here wherein the eyelet portion and the cable connection portion are substantially co-planar. That is, the cable eyelet has an overall planar configuration, recognizing the need for exceptions (e.g., for stand-offs, strengthening ribs or upsets, forging artifacts, etc.) consistent with the particular application. Thus, in certain such co-planar embodiments wherein the cable connection portion forms an elongate socket or the like to receive the end of the brake cable, the longitudinal axis of such socket extends in the plane of the eyelet opening or in a closely adjacent and parallel plane.

In accordance with another aspect, a one-piece park brake cable eyelet comprises an eyelet portion and a cable connection portion unitary with the eyelet portion. In certain exemplary embodiments the eyelet is a one-piece forging. The eyelet portion forms an eyelet opening suitable to removably receive a brake arm, i.e., to be attached to a brake arm for use and to be detached without damage for service, repairs, etc. The cable eyelet has an opening formed by surfaces including a straight, rearward facing front surface suitable for operative contact with the brake arm at least intermittently during use, i.e., contact effective to move the brake arm, e.g., to its brake-applied position. The eyelet surfaces forming the eyelet opening also include, at least, parallel right and left side surfaces perpendicular to the front and rear surfaces, with a beveled front right corner between the front surface and the right side surface, and a beveled front left corner between the front surface and the left side surface. In certain exemplary embodiments the eyelet surfaces forming the eyelet opening also include a straight, forwardly facing rear surface parallel with the front surface. The cable connection portion of the cable eyelet extends rearwardly from the eyelet portion and in certain exemplary embodiments comprises an elongate, rearwardly open cable-end receiving socket. In certain exemplary embodiments the parking brake cable eyelet is a one-piece forged cable eyelet wherein the eyelet portion and the cable connection portion are substantially coplanar.

In accordance with another aspect a park brake assembly for a motor vehicle comprises an elongate park brake cable as described above. The park brake further comprises a brake arm and a friction member mounted for movement by the brake arm between a brake-applied position and a brake-unapplied position. The cable eyelet is operatively attached to the brake arm, typically by simply receiving the brake arm into the bevel-cornered opening formed by the eyelet portion, such that tensioning the brake cable effects application of the brake. The cable connection portion is connected to the second end of the brake cable. In certain exemplary embodiments the park brake assembly further comprises a park brake actuator suitable to be mounted in a passenger compartment and connected to the first end of the brake cable.

It will be appreciated by those skilled in the art, given the benefit of this disclosure, that the motor vehicle park brake cables disclosed above and further discussed below, and the disclosed cable eyelets, and motor vehicle park brake systems comprising such cables or eyelets provide significant advantages. For example, in certain embodiments described further below, improved retention of the cable to the brake arm can be achieved. At least certain exemplary embodiments of the eyelets and cables have good manufacturability. These and at least certain other embodiments of the systems, e.g., methods, devices etc., disclosed here are suitable to provide advantageous convenience, economy, etc. Additional advantages will be apparent to those skilled in the art given the benefit of this disclosure.

BRIEF DESCRIPTION OF THE DRAWINGS

FIG. 1 is a perspective view of a park brake cable eyelet in accordance with the present disclosure.

Figure 1:
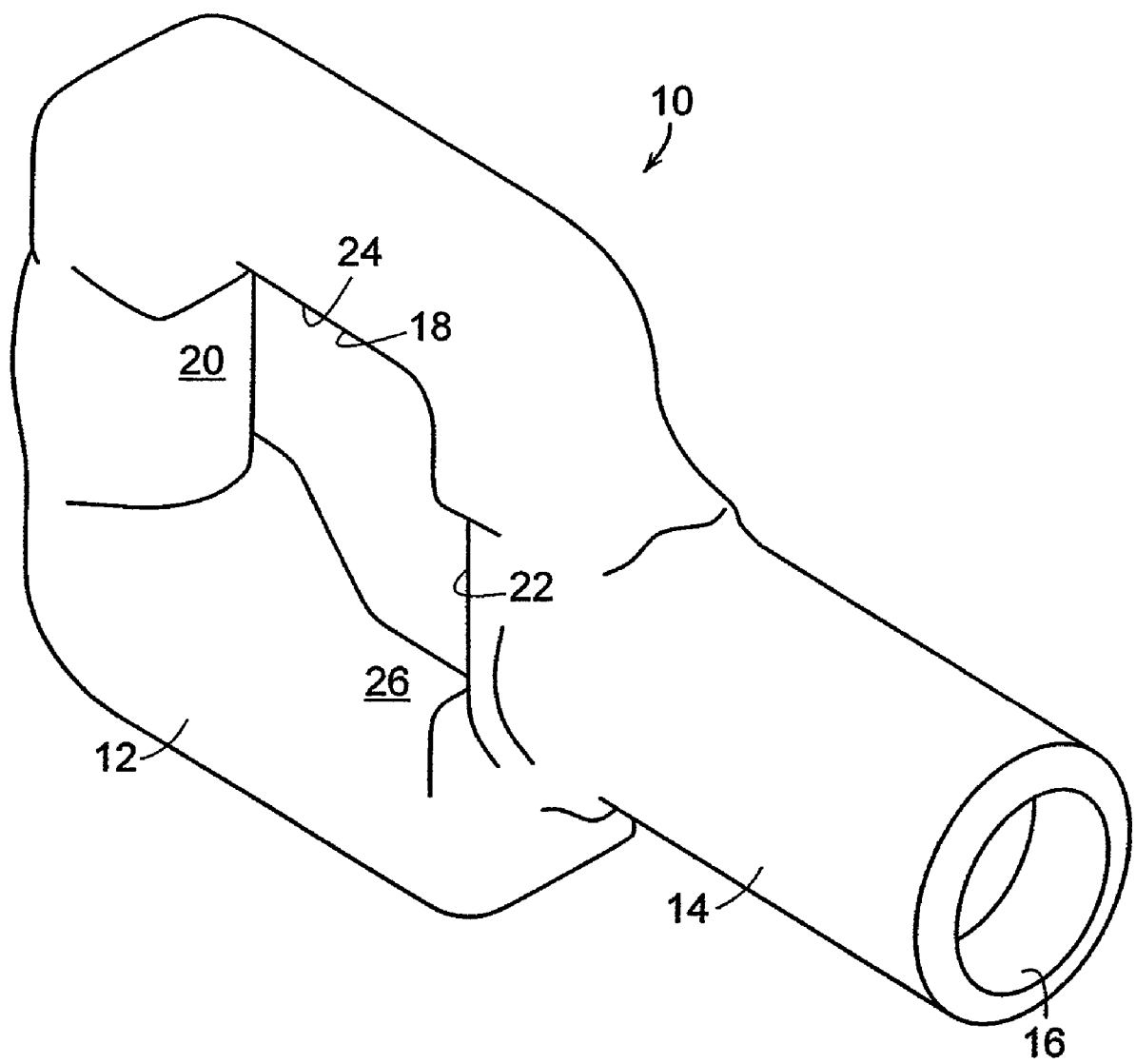
FIG. 1 is a schematic illustration, partially broken away, of one embodiment of a park brake cable in accordance with the present disclosure, showing a cable eyelet attached at one end of cable.

The figures referred to above are not drawn necessarily to scale and should be understood to provide a representation of certain exemplary embodiments of the invention, illustrative of the principles involved. Some features depicted in the drawings have been enlarged or distorted relative to others to facilitate explanation and understanding. In some cases the same reference numbers may be used in drawings for similar or identical components and features shown in various alternative embodiments. Particular configurations, dimensions, orientations and the like for any particular embodiment will typically be determined, at least in part, by the intended application and by the environment in which it intended to be used. All references to direction and position, unless otherwise indicated, refer to the orientation illustrated in the drawing(s) being discussed.

DETAILED DESCRIPTION OF CERTAIN EXEMPLARY EMBODIMENTS

It will be apparent to those skilled in the art, that is, to those who have knowledge or experience in this area of technology, that many alternative designs are possible for the motor vehicle park brake cables and cable eyelets disclosed here.

The following detailed discussion of various alternative and preferred embodiments will illustrate the general principles of the invention. Other embodiments, including embodiments suitable for other applications, will be apparent to those skilled in the art given the benefit of this disclosure.

A brake arm, as that term is used here, is a cable mounting or attachment fixture of a brake assembly, for operation of the brake assembly by axial pulling or pushing forces transmitted to the brake assembly by the cable. Typically, the brake arm is operably connected to one or more brake pads or other moveable friction member(s) or the like of the park brake mechanism, which is moved into engagement with a corresponding component or surface of a vehicle wheel, driveshaft or the like to secure the vehicle. Operation of a park brake lever or other actuation mechanism tensions the brake cable, thereby moving the park brake cable eyelet to correspondingly move the brake arm. In certain exemplary embodiments the brake lever or other actuator is be positioned in the passenger compartment of the motor vehicle for convenient access. Typically, the brake arm is a lever, pivotally mounted or otherwise moveably mounted at a housing, bracket or other structural component of a park brake mechanism located at the vehicle wheel, driveshaft or the like which is to acted upon by the park brake to secure the vehicle.

In accordance with certain exemplary embodiments the bevel-cornered eyelet opening of the park brake cable eyelets disclosed here is the opening in the eyelet which receives a brake arm of a park brake mechanism. When the brake cable is tensioned to apply the park brake, the radially inside surface of the eyelet opening contacts the brake arm to move the brake arm to the brake-applied position. In typical embodiments the brake cable extends rearward from its attachment to the cable eyelet and pulls the eyelet rearward to apply the park brake. Thus, in such embodiments it is primarily the front inside surface of the eyelet opening that contacts and acts against the brake arm as the cable is tensioned and the park brake is applied. Such front surface of the eyelet opening preferably is straight and perpendicular to the direction of cable tension during application of the park brake. Alternatively the front surface may be somewhat curved, either convexly or concavely. Similarly, side and rear inside surfaces of the opening are conveniently formed as straight surfaces. Alternatively they may be somewhat curved or otherwise configured for performance, ease of manufacture, assembly, etc.

As used here, the "bevel-cornered eyelet opening" of the park brake cable eyelets disclosed here have bevel surfaces or bevels at one or more corners, preferably at the front corners for certain embodiments, i.e., at the corners further away from the connection to the brake cable. In certain exemplary embodiments the eyelet opening has, in addition to the front surface which primarily contacts the brake arm when the brake cable is being tensioned to apply the park brake, right and left side surfaces that extend parallel to each other and in a generally perpendicular direction, i.e., about 90 degrees to the front surface. The bevel-cornered opening in certain embodiments also has a rear inward-facing surface extending between the left and right side surfaces. The rear surface preferably is straight and parallel to the front surface. In certain exemplary embodiments of the park brake cable eyelets disclosed here, the outside (i.e., radially outward) configuration of the eyelet is generally square, optionally following or mimicking the corner beveling.

In the case of a front corner bevel, the bevel surface extends from the front of the eyelet opening rearward at an angle to a side surface of the opening, preferably leaving at least about one-third, such as about 35% to 75%, e.g., about 45% to 50%, of the lateral dimension of the front surface straight (i.e., not beveled) centered between the bevels, In certain exemplary embodiments wherein the right front corner and the left front corner are beveled, each presents a surface that extends between or joins the front and corresponding side of the opening at an angle that is not a right angle. In certain exemplary embodiments the bevel surface is at a 35-55 degree angle, e.g., a 40-50 degree angle to the front surface, preferably in at least certain exemplary embodiments at a 45 degree angle. The bevel surface resists unintended turning of the eyelet relative to the brake arm during use and, thus, may contact the brake arm. Such contact may be referred to here as position-constraining contact, because it constrains the position of the brake arm in the eyelet opening. That is, it acts to resist the cable eyelet twisting or turning away from its proper orientation to the brake arm during normal operation, for example due to vibrations and/or pushing and pulling axial forces along the cable during use. The beveled corners therefore serve to retain the cable eyelet on the brake arm, i.e., to resist unintended detachment or disengagement of the cable eyelet from the brake arm. As stated above, the lateral dimension of the eyelet opening is larger than the fore-and-aft dimension, such that the cable eyelet is readily removable from the brake arm if turned about 90 degrees from the normal operating orientation. Thus, turning the eyelet, e.g., manually, facilitates installation and removal from the brake arm. The eyelet opening of the park brake cable eyelet may be said to be operative to receive a brake arm in a secure fashion, either temporarily or permanently, in a motor vehicle park brake assembly. A "secure fashion" means that the cable eyelet, properly installed on a correspondingly sized brake arm, resists detachment from the brake arm due to expected axial pushing and pulling forces along the cable during normal use. In addition to providing a secure attachment, the smaller fore-and-aft dimension of the eyelet opening reduces travel and lost motion at the brake arm when the park brake is applied and released. This can provide, in certain exemplary embodiments, an improved park brake user interface and/or performance.

Figure 2:
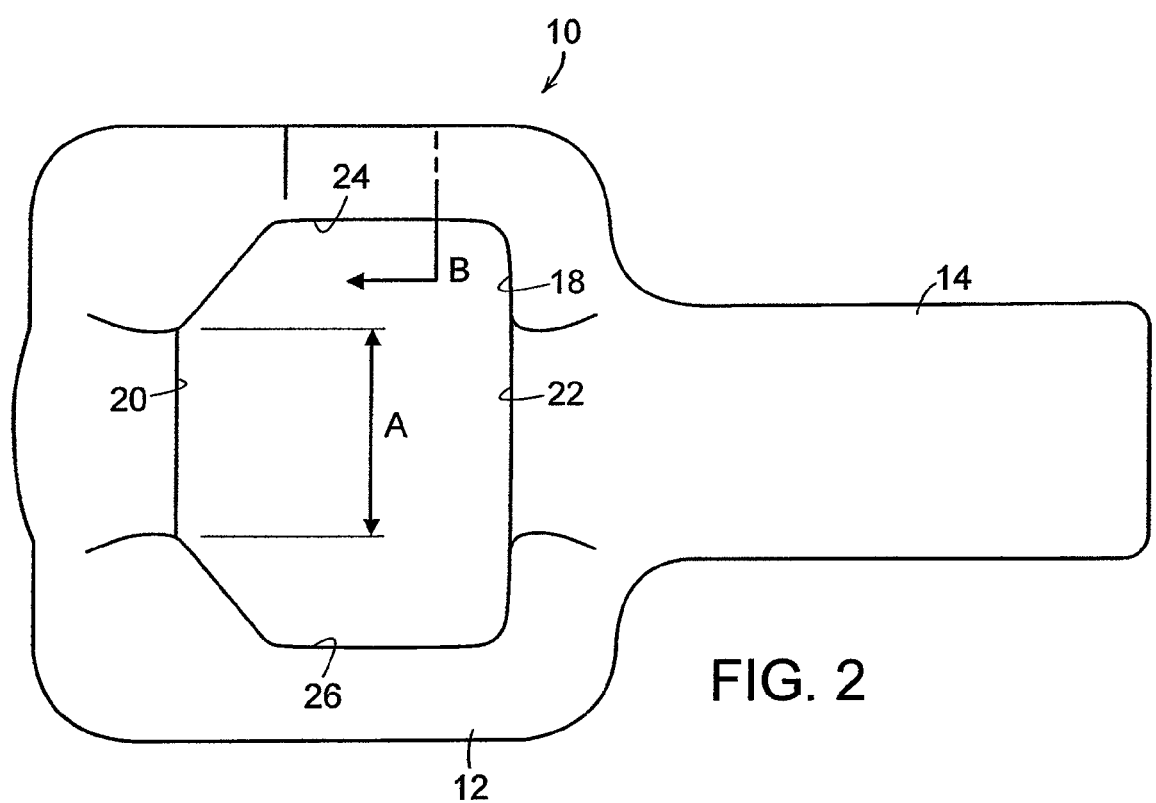
FIG. 2 is a plan view of the park brake cable eyelet of FIG. 1.

Referring now to FIGS. 1 and 2, an exemplary cable eyelet 10 is a unitary (i.e., one-piece) forging having an eyelet portion 12 and a cable connection portion 14. Connection portion 14 forms a rearwardly open socket 16 to receive the end of a park brake cable, having a longitudinal dimension of, e.g., 14.7-15.2 mm, an outside diameter of about 7.7-8.1 mm, and an inside diameter of about 3.5 mm, optionally to be tapped. Eyelet portion 12 has a substantially square exterior form of about 19 mm by 19 mm and forms an eyelet opening 18 to receive a brake arm of a park brake mechanism. Opening 18 has a lateral dimension of, e.g., about 13.2 mm between side surfaces 24, 26 and a fore-and-aft dimension of, e.g., about 10.0 mm between inward facing front surface 20 and forward facing rear surface 22. Surfaces 22, 24, 26 and 28 each is substantially straight. Side surfaces 24, 26 are substantially parallel each other and perpendicular to front and rear surfaces 20, 22. Opening 18 also has two bevel corners, specifically, front left bevel corner 30 and front right bevel corner 32, each at 45 degrees to the front surface and to its respective side surface. Each bevel surface has a lateral dimension of, e.g., about 3.4 mm. It can be seen that the cable connection portion 14 extends rearward from the middle (laterally) of the rear section of the eyelet portion and perpendicular thereto.

Figure 3:
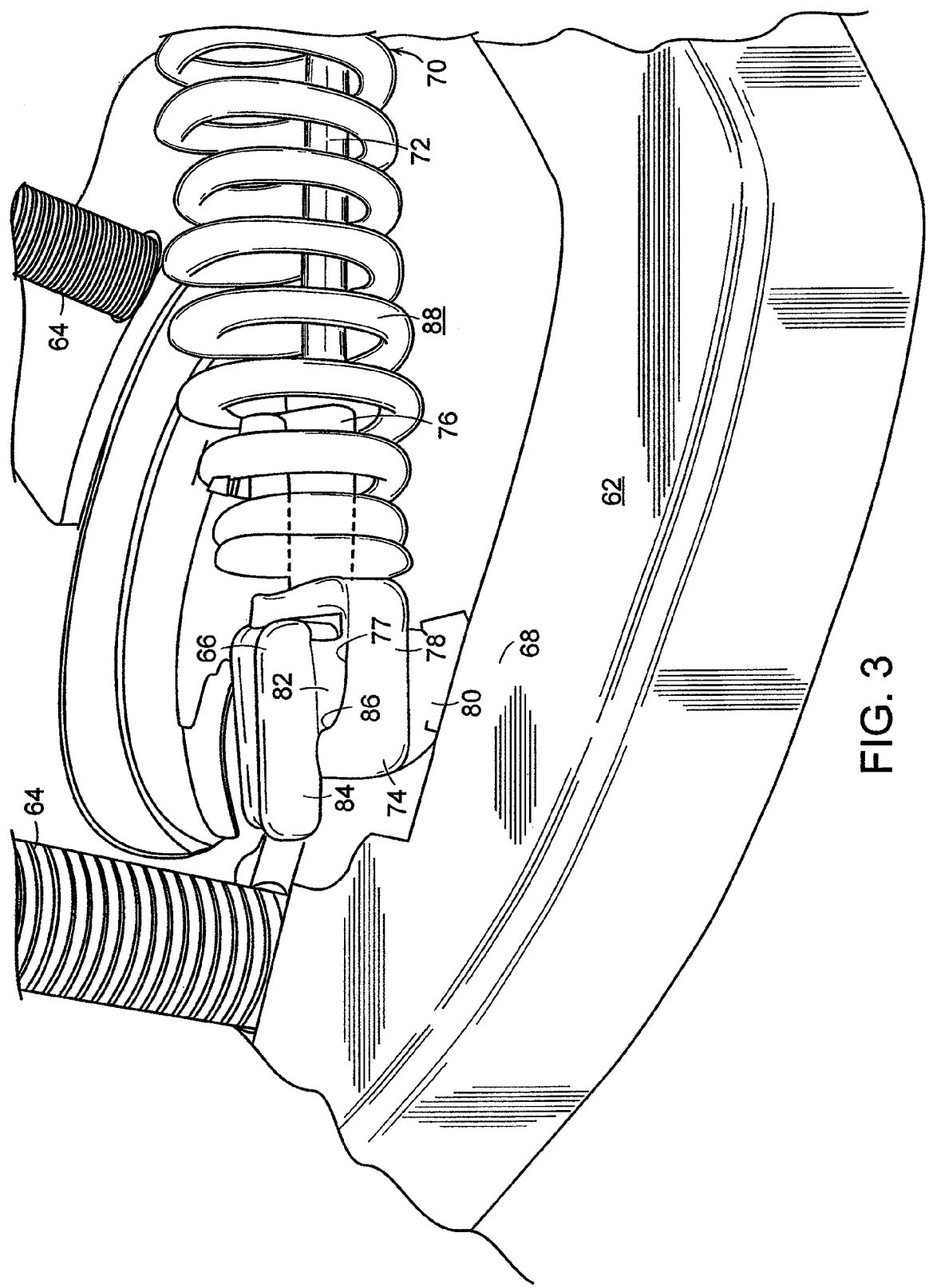
FIG. 3 is a schematic perspective view of a motor vehicle park brake assembly comprising a brake cable having the cable eyelet of FIG. 1 fitted onto a brake arm of a park brake mechanism suitable to be mounted at a wheel of a motor vehicle.
Figure 4:
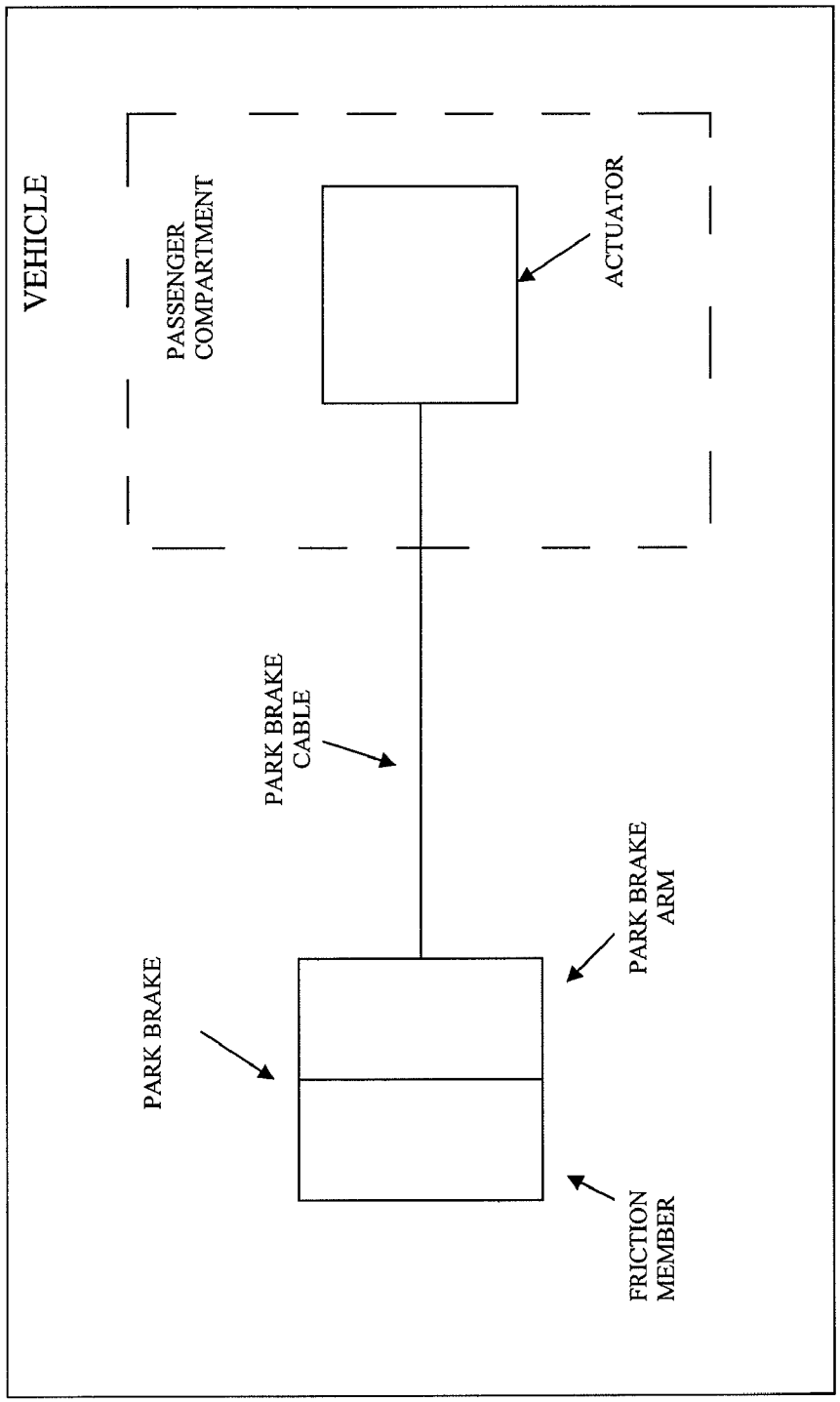
FIG. 4 is a schematic illustration of a vehicle having a park brake assembly in accordance with the present invention.

Referring now to FIG. 3, a motor vehicle park brake assembly 60 is seen to comprise a park brake mechanism 62 suitable to be mounted at a wheel of a motor vehicle by bolts 64 (and optionally additional mounting bolts and/or other mounting means) and comprising a friction pad (not shown) for contact with a wheel component during application of the park brake to secure the position of the vehicle. Brake mechanism 62 further comprises a lever type brake arm 66 operative to control the friction pad. Brake arm 66 extends through member 68 of the brake mechanism. Park brake cable 70 has a first end (not shown) suitable to be attached to a brake actuator located in the passenger compartment of a motor vehicle, e.g., a hand lever, electric motor, etc. The second end 72 of cable 70 is attached to cable eyelet 74 which, in turn, is attached to brake arm 66. More specifically, the cable end 72 is fixedly received into rearwardly open socket 76 of the cable connection portion of eyelet 74. Cable eyelet 74 is attached to brake arm 66 simply by receiving brake arm 66 into eyelet opening 77 formed by eyelet portion 78. It can be seen that eyelet 74 sits adjacent to base 80 of brake arm 66. Neck or post portion 82 of the brake arm extends through the eyelet opening 77. Head portion 84 of the brake arm extends forwardly beyond the front surface of the eyelet opening 77. Together with the small dimension of the opening 76 relative to the fore-and-aft dimension of the post 82 and the front left bevel 86 and front right bevel (not seen) of the eyelet opening 77, this operates to secure the attachment of the eyelet to the brake arm. Eyelet opening 77 has a lateral dimension larger than the fore-and-aft dimension of the opening to facilitate assembly and removal of the eyelet 74 from the brake arm 66 by turning the eyelet 90 degrees from the normal installed orientation shown in FIG. 3. It can be seen that tensioning cable 70 will operate to compress coil spring 88 and pull brake arm 66 to the right (as viewed in FIG. 3) to its brake-applied position. Correspondingly, releasing cable 70, i.e., releasing the tension on cable 70 will allow coil spring 88 to bias brake arm 66 to the brake-unapplied position.

While certain particular embodiments of the invention have been illustrated and described, it will be apparent to those skilled in the art that numerous modifications and additions can be made without departing from the true spirit and scope of the invention. Accordingly, it is not intended that the invention be limited except in accordance with the terms of the following claims. In the following claims, definite and indefinite articles such as "the," "a," "and," and the like, in keeping with traditional patent law and practice, mean "at least one." In general, unless expressly stated otherwise, all words and phrases are used above and in the following claims are intended to have all of their various different meanings, including, without limitation, any and all meaning(s) given in general purpose dictionaries, and also any and all meanings given in science, technology or engineering dictionaries, and also any and all meanings known in the relevant industry, technological art or the like. Thus, where a term has more than one possible meaning, all such meanings are intended to be included for that term as used here. In that regard, it should be understood that if a device, system or method has the item as called for in a claim below (i.e., it has the particular feature or element called for), and also has one or more of that general type of item but not specifically as called for in the claim, then the device, system or method in question satisfies the claim requirement. Those one or more extra items are simply ignored in determining whether the device, system or method in question satisfies the claim requirement.

I claim:

1. A park brake assembly for a motor vehicle, comprising, in combination:
   a. a park brake actuator;
   b. a park brake suitable to be mounted at a wheel of a motor vehicle and comprising a brake arm and a friction member mounted for movement between a brake-applied position and a brake-unapplied position by the brake arm, the brake arm including a head and a post;
   c. an elongate park brake cable connected between the park brake actuator and the park brake; and
   d. a cable eyelet, connected to the brake cable and to the brake arms the eyelet having a portion forming an opening wherein the fore-and-aft dimension of the eyelet opening is smaller than the fore-and-aft dimension of the brake arm head such that the eyelet is not removable from the brake arm in a normal operating orientation.

2. The park brake assembly for a motor vehicle in accordance with claim 1 wherein the park brake actuator is suitable to be mounted in a passenger compartment and connected to an end of the brake cable.

3. The park brake assembly for a motor vehicle in accordance with claim 1 wherein the fore-and-aft inside dimension of the opening between the front surface and the rear surface is less than the lateral inside dimension of the opening between the left and right side surfaces.

4. The park brake assembly for a motor vehicle in accordance with claim 3 wherein the fore-and-aft inside dimension of the opening between the front surface and the rear surface is at least 65% of the lateral inside dimension of the opening between the left and right side surfaces.

5. The park brake assembly for a motor vehicle in accordance with claim 1 wherein the eyelet portion includes a front surface suitable for operative contact with the brake arm during the brake-applied position and interior beveled corners at the intersection of the front surface and side surfaces.

6. The park brake assembly for a motor vehicle in accordance with claim 1 wherein the cable eyelet is removable from the brake arm when the cable eyelet is at an orientation that is 90 degrees from the normal operating orientation.

7. The park brake assembly for a motor vehicle in accordance with claim 1 wherein the cable eyelet is configured for rotation around the brake arm head from the normal operating condition to an orientation that is 90 degrees from the normal operating orientation.

\* \* \* \* \*